Sept. 15, 1964     A. W. LINDHOLM     3,148,572
SCRAP REJECTERS FOR CUTTING DIES FOR BLANKS
Filed Aug. 15, 1963     2 Sheets-Sheet 1

INVENTOR:
ARTHUR W. LINDHOLM
BY
Sutherland, Polster + Taylor
ATTORNEYS.

Sept. 15, 1964 A. W. LINDHOLM 3,148,572
SCRAP REJECTERS FOR CUTTING DIES FOR BLANKS
Filed Aug. 15, 1963 2 Sheets-Sheet 2

INVENTOR.
ARTHUR W. LINDHOLM
BY
Laurence M. Goodridge
ATTORNEY.

United States Patent Office 3,148,572
Patented Sept. 15, 1964

3,148,572
SCRAP REJECTERS FOR CUTTING DIES
FOR BLANKS
Arthur William Lindholm, Webster Groves, Mo., assignor to Independent Die & Supply Company, St. Louis, Mo., a corporation of Missouri
Filed Aug. 15, 1963, Ser. No. 303,218
5 Claims. (Cl. 83—145)

This invention relates to improvements in cutting dies for forming blanks of complex shape from sheet material and is a continuation-in-part of my co-pending application Serial No. 171,059, filed February 5, 1962, now abandoned. Such dies are used in presses which are powerful enough to force the sharp cutting edges of the die through thick sheets, or a stack of hundreds of thin sheets. In most instances, the die is of the closed type, that is, it has a continuous cutting edge, and this cutting edge is formed by an exterior bevel which during cutting will necessarily tend to force the scrap away from the blank, or stack of blanks, as the die progresses through the sheet. The action of the bevelled edge produces a wedge-like action and will ordinarily act as a scrap rejecter for the die. Since the angle and the length of the bevel is usually uniform along the full periphery of the die, its action as a scrap rejector will be uniform. This is desirable for most dies. It is not desirable, however, when the blank to be cut requires a re-entrant cutting edge portion on the die which places bevelled surfaces opposite one another on opposite sides of a notched edge in the blank. Under these circumstances, it has been found that the bevelled edges wedge the scrap so firmly between them that progress of the die through the stack is impeded. This wedging action can produce stress sufficient to fracture the die.

It is one of the objects of this invention to provide a die with a scrap rejector which will clear the die at a re-entrant portion thereon where the scrap tends to wedge between opposed bevelled surfaces on the die as the cutting progresses through the stack.

It is another object of this invention to provide the die with a scrap rejecter which, unlike the bevelled edge, produces a non-uniform action to reject the scrap as the cutting progresses through the stack.

According to this invention, the exterior surface of the die facing away from the re-entrant portion in a die is provided with a narrow wedge-like piece which has a tapered end merging with and extending along the bevelled surface near the cutting edge of the die and slightly back therefrom. This wedge-like surface produces a greater degree of wedging action than the bevelled edge. It produces a non-uniform wedging action at the exterior face of the die. Non-uniform in the sense that locally of the wedge-like surface there is a separation between the scrap and the bevelled edge of the die. This non-uniform wedging action, when operating adjacent the re-entrant die portion, effectively clears the die as the cutting action progresses.

Further objects and advantages of this invention will appear from the following detailed description which is in such clear, concise and exact terms as to enable anyone skilled in the art to make and use the same when taken with the accompanying drawings forming a part thereof and in which.

Figure 1:
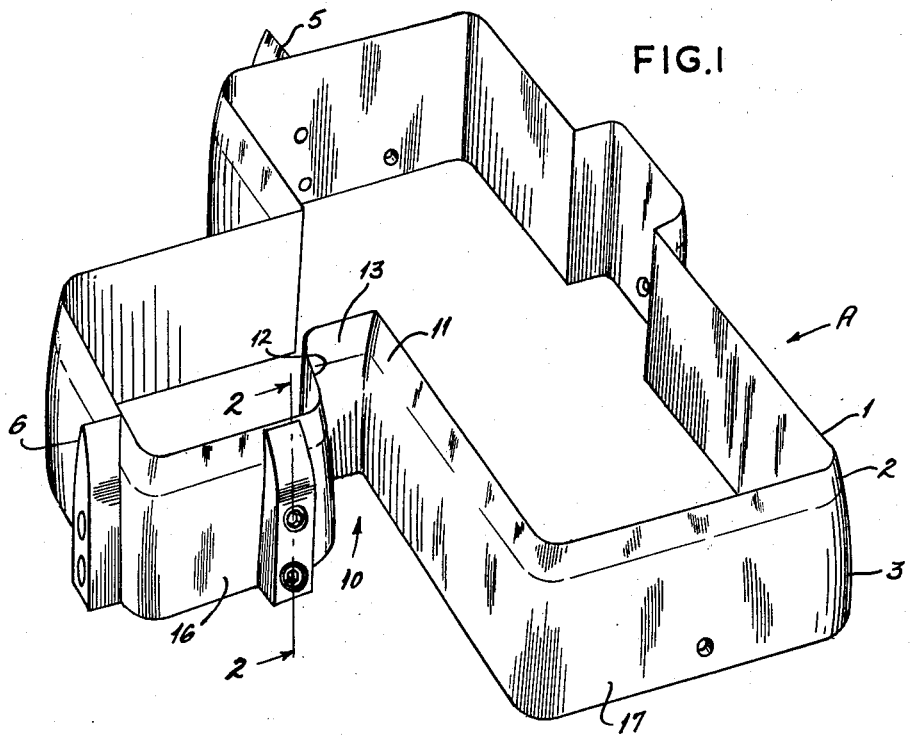
FIG. 1 is a perspective view of a die constructed in accordance with this invention showing the sharp edge of the die facing upwardly.

The die A, shown in FIG. 1 of the drawings, is just one example of a die shape used for cutting a special kind of envelope to suit a particular need. A common feature of all of such dies, however, is that they will be formed with a continuous, or nearly continuous, cutting edge 1. This edge is usually ground to desired razor sharp condition by tools which form a bevel, such as 2, either inside or outside of the shank portion 3 of the die. The die, illustrated in FIG. 1, is of the closed type and contoured to define the outer peripheral shape of the blank to be cut. The shape of the blank to be cut determines the closed contour defined by the die A. The die is adapted for use in a conventional press and the knife edge 1 of the die is forced through a stack of sheets possibly several hundred at a time by the action of the press. As the knife edge 1 penetrates the stack of sheets, the bevelled edge 2 has a wedge-like action tending to separate the scrap at the outside of the knife edge 1 from the cut blanks within the contour of the die A. In order to aid the wedge-like action of the bevel 2, the die A is provided with knife edged slitters 5 and 6 spaced about its periphery. These auxiliary cutters 5 and 6 slit through the scrap from the edge of the die 1 toward the outer edge of the stack of sheets. This slits the scrap so that the action of the bevelled surfaces 2 may wedge the scrap outwardly of the die A and thus clear the die of the scrap.

It will be readily apparent that the contour of a blank to be cut determines not ony the shape of the knife edge 1 but also the contour of the entire die A. In some instances, the contour of the blank to be cut requires that the die contour have a re-entrant portion, such as generally indicated 10. As illustrated in FIG. 1 of the drawing, the configuration of the re-entrant portion 10 of the die will locate portions 11 and 12 of the bevel opposite one another and on opposite sides of a portion of the stack of scrap which will protrude therebetween during the cutting operation. Under these circumstances where the die is so formed as to have a re-entrant portion to cut a notched edge in the blank, the portion of the bevel 2 at 11 and 12 is likely to produce a wedging action on the scrap jamming the scrap within the re-entrant portion 10 so as to impede progress of the die through the stack. It is entirely possible for this wedging action to break the die. It has been discovered that this action of the die can be avoided and that the solution is to attach one or more wedge-like pieces, such as shown in 15, to a portion of the die adjacent the re-entrant portion, such as 16 or 17, which portions of the die face away from the direction into the re-entrant portion of the die. The wedge-like piece 15, when so located, will produce a scrap rejection action greater than the bevel 2 to help clear the portion 13 of the die.

Figure 2:
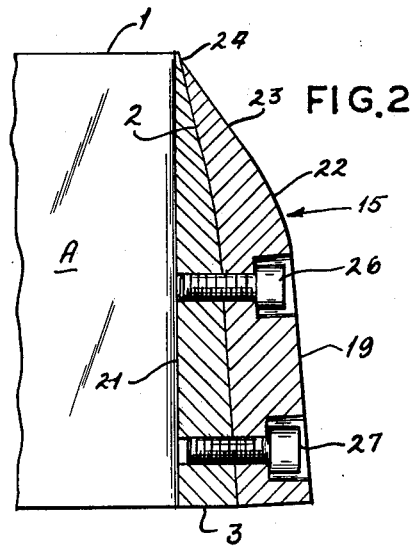
FIG. 2 is a sectional view taken on the line 2—2 of FIG. 1 looking in the direction of the arrows; and, FIG. 3 is a fragmentary view in perspective illustrating a die constructed in accordance with this invention.

In one form of the invention shown in FIG. 2, the wedge-like piece 15 has a face 19 which is slightly divergent with respect to the vertical and the inner straight face 21 within the die A. Face 19 is curved inwardly toward the die at the point 22 into a face 23 which is more steeply inclined with respect to the vertical and the inner surface 21 of the die to form a wedge-like surface merging at the point 23 spaced slightly from the knife edge 1 of the die. The wedge-like piece 15 may be secured to the die by any suitable means, in this instance, by the screws 26 and 27 recessed from the face 19 and threadedly engaging the shank portion 3 of the die.

Figure 3:
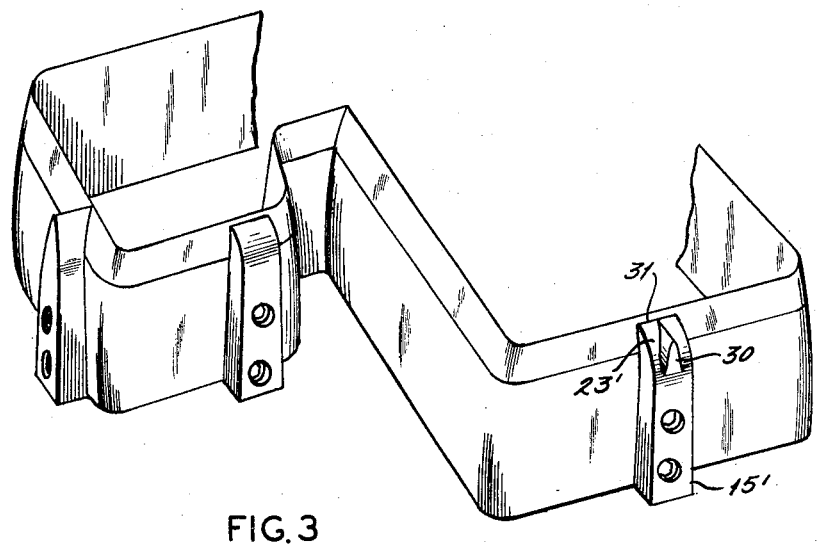

In another form of the invention shown in FIG. 3, the wedge-like piece 15′ mounts a slitter 30 with a knife edge 31 similar to that shown on slitters 5 and 6. The wedge and slitter are thus combined to form a scrap slitter-rejecter.

As has already been mentioned, the problem of clearing the scrap from the die A is produced to a large extent by the action of the bevel 2 aided by the slitters 5 and 6 which have knife edges coplanar with the knife edge 1 of the die A. These slitters separate, or break, the continuity of the scrap pieces which would tend to wedge against the outer surface of the bevel 2 and the shank portion 3 as the die progresses through the stack of sheets. The slitters 5 and 6 open up the scrap pieces formed so as to prevent the clinging of the scrap to the outer surfaces 2 and 3 of the die. Where this cannot be performed in the re-entrant portion 10, a wedge-like piece 15, or 15', acts to clear the re-entrant portion. The manner of action of the piece 15, or 15', can be likened to that of a movable cam at the inner periphery of the scrap separated by the die A. As the die A is pressed into a stack of sheets, the paper of the stack will naturally be depressed adjacent the sharp edge 1 of the die A. As each sheet in the stack is cut, it would naturally tend to flatten out unless prevented. In this case, flattening out is prevented since the severed edge of the scrap immediately passes onto the steeply divergent surface 23 and 23' of the wedge-like piece 15 and 15'. This inclined surface 23, or 23', then produces a sliding action between the stack of sheets in the scrap as it penetrates progressively moving each sheet in the stack of scrap outwardly of the re-entrant portion 10 of the die so that each sheet in the stack is severed, each sheet in the stack of scrap is progressively moved outwardly of the re-entrant portion 10 thereby clearing the die.

The progressive action of the wedge-like pieces can be materially aided, if, at the same time, the scrap edge is slit partially, or fully, after being separated from the blank by the knife edge 1 of the die. This slitting action can be performed either by one or more slitters 5 and 6, located as shown, or by a slitter 30 on the cam face 23' of the wedge-like pieces 15, as shown at 15'. Slitters, such as 5 and 6, have knife edges formed by bevelled surfaces. These surfaces in turn produce their own camming action tending to separate the scrap. Thus, slitter 6 and wedge-like piece 15 work together even though spaced apart. Both separate the scrap from the blade in the same direction.

Blade 30 and surface 23' cooperate but in a slightly different way. Actually, blade 30 and edge 31 aid the action of wedge-like piece 15' by facilitating its penetration into the stack of scrap. Edge 31 severs the inner edge of the scrap so that the wedge surface 23' can open up a wider gap between scrap and blade. When once slit, a sheet will tear easily. Blade 30 separates the edges of the slit to tear them apart, and wedge face 23' aids this action of the blade 30.

Let it be understood that 15 and 15' are regarded as equivalents in most applications.

Changes in and modifications of the construction described may be made without departing from the spirit of my invention or sacrificing its advantages.

Having thus described the invention, what is claimed and desired to be secured by Letters Patent is:

1. In a die having a sharpened edge formed by a bevel which edge is contoured to cut a plurality of blanks of predetermined shape from a stack of sheets, said die having a re-entrant portion which locates portions of said bevel in opposed relation on opposite sides of a stack of scrap and so acts to wedge the sheets in the stack of scrap between opposite bevels as the cutting progresses, and a slitting knife edge to sever the scrap adjacent said re-entrant portion, the improvement which comprises a wedge-like piece with a tapered end merging with said bevel adjacent said cutting edge, said wedge-like piece being secured to the surface of said die adjacent to said re-entrant portion and between said re-entrant portion and said slitting knife to eject the scrap from said re-entrant portion as the cutting progresses by said slitting knife and die to clear the re-entrant portion of the die.

2. In a die having a continuous sharpened edge formed by a continuous bevel merging into said sharpened edge and contoured to cut a plurality of blanks of predetermined shape from a stack of sheets, said die having a re-entrant portion which locates portions of said bevel in opposed relation on opposite sides of a piece of scrap so that said bevel portions act to wedge the scrap between opposite bevel portions as the cutting progresses, and knife and scrap slitters spaced from said re-entrant portion and having knife edges coplanar with the sharpened edge of said die and extending outwardly to the edge of the stack of sheets to be cut, the improvement which comprises a wedge-like piece with a tapered end merging with said bevel adjacent said cutting edge of said die, said wedge-like piece being secured to the surface of the die adjacent to said re-entrant portion on a portion of the die facing in a direction away from the direction into said re-entrant portion, said wedge-like piece being located between said re-entrant portion and one of said slitters to eject the scrap from the re-entrant portion as the cutting progresses by said slitter and said die to clear the re-entrant portion of the die.

3. In a die having a sharpened edge formed by a bevel which edge is contoured to cut a plurality of blanks of predetermined shape from a stack of sheets, said die having a portion which locates bevel edges in opposed relation on opposite sides of a stack of scrap and so acts to wedge the sheets in the stack between opposite bevels as the cutting progresses, the improvement comprising, (a) a slitting knife with a cutting edge angularly related to said sharpened edge on said die formed by a bevel and located to slit the stack of scrap at the bevelled side of said sharpened edge adjacent said die portion which locates bevel edges in opposed relation on opposite sides of the stack of scrap, and (b) a wedge-like piece with a tapered end merging with said bevel adjacent said cutting edge, and secured to said die adjacent to said slitting knife to eject the scrap as the cutting by said die and slitting knife progresses, both said wedge-like piece and said slitting knife having tapered surfaces tending to separate the opposed edges slit in the scrap.

4. The combination defined in claim 3 in which said slitting knife and said wedge-like piece are separate and in spaced relation on said die.

5. The combination defined in claim 3 in which said slitting knife and said wedge-like piece are combined and said cutting edge of said slitting knife projects from said tapered end on said wedge-like piece.

No references cited.